United States Patent
Maurus et al.

(10) Patent No.: US 12,416,533 B2
(45) Date of Patent: Sep. 16, 2025

(54) METHOD FOR MONITORING THE FUNCTION OF A CAPACITIVE PRESSURE MEASUREMENT CELL

(71) Applicant: IFM Electronic gmbH, Essen (DE)

(72) Inventors: Manfred Maurus, Bad Waldsee (DE); Peter Kimbel, Tettnang (DE)

(73) Assignee: IFM Electronic GmbH, Essen (DE)

( * ) Notice: Subject to any disclaimer, the term of this patent is extended or adjusted under 35 U.S.C. 154(b) by 387 days.

(21) Appl. No.: 17/769,968

(22) PCT Filed: Oct. 20, 2020

(86) PCT No.: PCT/EP2020/079481
§ 371 (c)(1),
(2) Date: Apr. 18, 2022

(87) PCT Pub. No.: WO2021/083736
PCT Pub. Date: May 6, 2021

(65) Prior Publication Data
US 2022/0412817 A1   Dec. 29, 2022

(30) Foreign Application Priority Data
Oct. 30, 2019   (DE) .......................... 102019129264.6

(51) Int. Cl.
*G01L 1/14* (2006.01)
*G01D 1/16* (2006.01)
*G01L 7/08* (2006.01)

(52) U.S. Cl.
CPC ............... *G01L 1/144* (2013.01); *G01D 1/16* (2013.01); *G01L 7/08* (2013.01)

(58) Field of Classification Search
CPC . G01L 1/144; G01L 7/08; G01L 1/142; G01L 9/0072; G01L 27/007; G01L 25/00;
(Continued)

(56) References Cited

U.S. PATENT DOCUMENTS

2001/0047689 A1* 12/2001 McIntosh .............. G01P 15/131
                                                              73/514.32
2002/0140441 A1   10/2002 Raffalt et al.
(Continued)

FOREIGN PATENT DOCUMENTS

CN   108225495 A   6/2018
DE   197 08 330 C1   5/1998
(Continued)

*Primary Examiner* — Mohammad K Islam
(74) *Attorney, Agent, or Firm* — Patent Technologies, LLC; Robert D. Gunderman

(57) ABSTRACT

The invention relates to a method for monitoring the function of a capacitive pressure measurement cell (10) which has a measuring capacitor ($C_M$) and a reference capacitor ($C_R$), to which an internal excitation voltage $U_{E0}$ in the form of an alternating square-wave signal is applied. According to the invention, in order to allow the detection of a disturbing influence on the measurement result owing to, in particular, moisture-induced leakage currents, it is proposed that the corresponding voltage values $U_1$, $U_2$ be sensed from the voltage signal $U_{COM}$ during the falling and/or rising signal curve at least two defined times $t_1$, $t_2$, and the two pairs of values $t_1$; $U_1$ and $t_2$; $U_2$ are used to determine a linear equation $U=f(t)$, wherein the linear equation $U=f(t)$ within the falling or rising signal curve is used to calculate the time $t_x$ at which the voltage value $U_x$ set as a threshold value or switchover point in the comparator-oscillator (SG) is reached, wherein —either the time $t_x$ is compared with the actual switchover time of the comparator-oscillator (SG) and an error signal is generated in the event of significant deviation, —or the time $t_x$ is used to define a hypothetical switchover point of the comparator-oscillator (SG), from which a hypothetical working frequency is calculated, and an error signal is generated if there is significant deviation of said hypothetical working frequency from the actual working frequency of the comparator-oscillator (SG).

4 Claims, 4 Drawing Sheets

(58) Field of Classification Search
CPC .. G01L 9/12; G01L 9/003; G01D 1/16; G01D 3/08; G01D 5/24
See application file for complete search history.

(56) References Cited

U.S. PATENT DOCUMENTS

| | | |
|---|---|---|
| 2007/0227253 A1 | 10/2007 | Kleven |
| 2009/0126513 A1 | 5/2009 | Park et al. |
| 2013/0269412 A1* | 10/2013 | Walter .................. G01L 9/003 73/1.15 |
| 2016/0154030 A1* | 6/2016 | Kishida .................. G01L 1/144 324/679 |
| 2016/0162073 A1 | 6/2016 | Yilmaz et al. |
| 2017/0023429 A1* | 1/2017 | Straeussnigg ......... H03M 3/462 |
| 2017/0077912 A1* | 3/2017 | Fu .......................... H02M 3/158 |

FOREIGN PATENT DOCUMENTS

| | | |
|---|---|---|
| DE | 19838528 A1 | 8/1999 |
| DE | 19851506 C1 | 10/2000 |
| DE | 10333154 A1 | 2/2005 |
| DE | 10 2010 062 622 A1 | 6/2012 |
| DE | 102011083133 A1 | 3/2013 |
| DE | 10 2018 118 645 B3 | 11/2019 |
| DE | 10 2018 118 646 B3 | 11/2019 |
| EP | 2 738 535 A1 | 6/2014 |

* cited by examiner

METHOD FOR MONITORING THE FUNCTION OF A CAPACITIVE PRESSURE MEASUREMENT CELL

BACKGROUND OF THE INVENTION

Field of the Invention

The invention relates to a method for monitoring the function of a pressure measurement cell of a capacitive pressure sensor.

Description of Related Art

Capacitive pressure sensors or pressure measurement devices are used in many industrial fields for pressure measurement. They often comprise a ceramic pressure measurement cell as a transducer for the process pressure and evaluation electronics for signal processing.

Capacitive pressure cells consist of a ceramic base body and a membrane, wherein a glass solder ring is arranged between the base body and the membrane. The resulting cavity between the base body and the membrane allows a longitudinal movement of the membrane as a result of an influence of pressure. This cavity is therefore also referred to as a measuring chamber. Electrodes are respectively provided at the underside of the membrane and on the opposite upper side of the base body, which together form a measuring capacitor. The effect of pressure causes the membrane to deform, which results in a change in the capacitance of the measuring capacitor.

By use of an evaluation unit the change in capacitance is detected and converted into a pressure measurement value. As a rule, these pressure sensors are used to monitor or control processes. They are therefore frequently connected to higher-level control units (PLCs).

A capacitive pressure sensor is known from DE 198 51 506 C1, in which the pressure measurement value is determined from the quotient of two capacitance values of a measuring capacitor and a reference capacitor. Although a pressure measurement cell is not specifically described in this patent specification, the circuit and method described are suitable for capacitive pressure measurement cells. The special feature of this pressure measurement device is that for the evaluation of the measuring signal at the output, as a measure of the detected pressure measurement value only the amplitude of the square wave signal is relevant, independent of its frequency.

A circuit arrangement for a capacitive pressure sensor is known from EP 0 569 573 B1, in which likewise a quotient method is used for pressure evaluation.

Quotient methods usually assume the following pressure dependencies:

$$p \sim \frac{C_R}{C_M} \text{ or}$$

$$p \sim \frac{C_R}{C_M} - 1 \text{ or}$$

$$p \sim \frac{C_M - C_R}{C_M + C_R}$$

wherein $C_M$ is the capacitance of the measuring capacitor, $C_R$ is the capacitance of the reference capacitor and p denotes the process pressure to be determined. It is also conceivable to interchange $C_M$ and $C_R$ in the quotient. However, the example given with $C_M$ in the denominator represents the most common form in favor of the intrinsic linearization. In the following, therefore, this embodiment is assumed unless otherwise stated.

The reliability of capacitive pressure sensors is becoming increasingly important. An optimization of the measuring principle of pressure sensors with regard to possible leakage currents at the rear side of the measurement cell—facing away from the medium to be measured—or in parts of the evaluation electronics for the purpose of eliminating humidity components possibly introduced by the environment and tending to condensation is aimed at.

As a general state of the art with respect to monitoring the function of capacitive pressure sensors, DE 103 33 154 A1 and DE 10 2014 201 529 A1 are mentioned.

BRIEF SUMMARY OF THE INVENTION

It is an object of the invention to provide a method for monitoring the function of a pressure measurement cell of a capacitive pressure sensor, by means of which the detection of a disturbing influence on the measurement result due to, in particular, moisture-induced leakage currents is enabled.

This object is achieved by a method comprising the features of claim 1. Advantageous embodiments of the invention are provided in the subclaims.

The invention is based on the knowledge that moisture on the measurement cell rear side facing away from the medium to be measured or in parts of the evaluation electronics and the resulting leakage currents entail a change in the triangular voltage signal $U_{COM}$ generated by the measuring capacitor in combination with a comparator oscillator. Instead of an evenly linear rising and falling curve progression, a belly-like curve progression is produced in this case. In concrete terms, the curve progression then appears such that both during the rising curve progression of the triangular signal and during the falling curve progression the slope decreases. Depending on how large the resistive influence is, a more or less pronounced belly-like curve progression is obtained.

The method according to the invention provides for the detection of such signal curve progressions that during the falling and/or the rising signal curve progression at least two defined time points $t_1$, $t_2$, the corresponding voltage values $U_1$, $U_2$ are detected from the triangular voltage signal $U_{COM}$ and a linear equation U=f(t) is determined on the basis of the two value pairs $t_1$; $U_1$ and $t_2$; $U_2$. By use of this linear equation U=f(t), the time point $t_x$ can be calculated within the falling or rising signal curve progression at which the voltage value $U_x$ set in the comparator oscillator as the threshold value or switchover point is reached. There are now two possibilities for the analysis and thus for the error indication: either an error signal is generated if the time point $t_x$ deviates significantly from the actual switchover point of the comparator oscillator or if the fictitious working frequency which is calculated from the switchover point of the comparator oscillator defined at the time point $t_x$ deviates significantly from the actual working frequency of the comparator oscillator.

Thus, with the existing evaluation circuit and thus without additional components, it is possible by means of an appropriate signal evaluation to perform a monitoring of the function of the pressure measurement cell of a capacitive pressure sensor and to detect resistive disturbing influences caused by leakage currents quickly at an early stage.

Alternatively, moreover, a differentiated evaluation is conceivable, in which per period of the resulting differentiated square wave signal during at least one pulse width, i.e. either a positive or a negative pulse or both pulses, the pulse height is measured at least twice and the measured voltage values are stored in a memory. The at least two voltage values per pulse width are then compared with each other, e.g. by subtracting, and if there is a significant deviation from each other, a corresponding error signal is generated.

In the following, the invention is explained in more detail based on exemplary embodiments with reference to the drawings.

DESCRIPTION OF THE PREFERRED EMBODIMENTS

In the following description of the preferred embodiments, identical reference symbols denote identical or comparable components.

Figure 1:
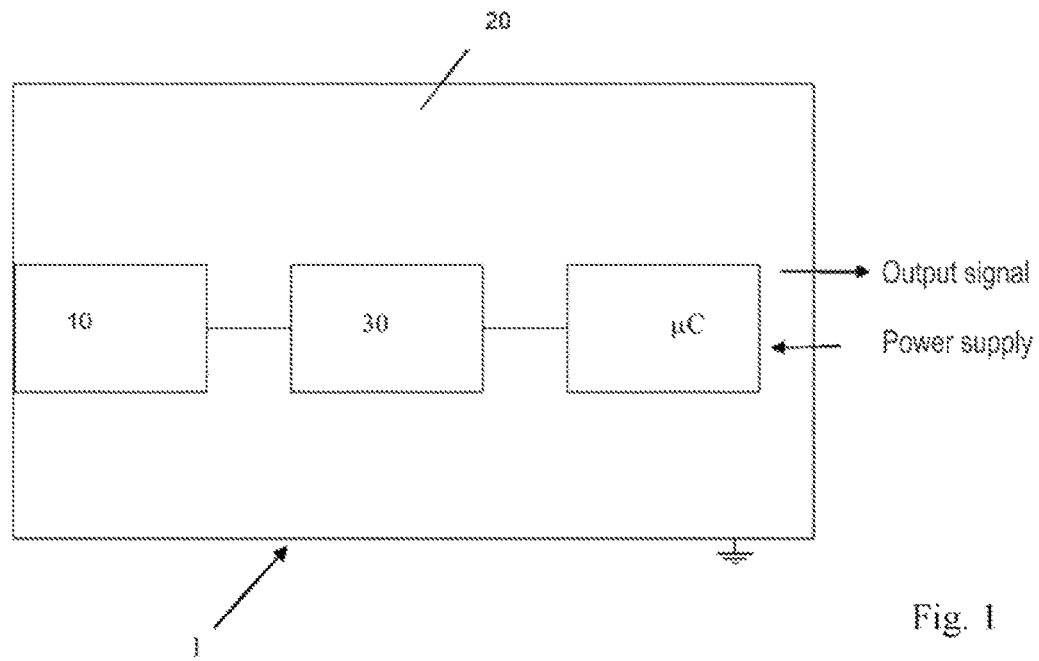
FIG. 1 a block diagram of a capacitive pressure measurement device.

FIG. 1 shows a block diagram of a typical capacitive pressure measurement device used to measure a process pressure p (e.g. of oil, milk, water, etc.). The pressure measurement device 1 is designed as a two-wire device and essentially consists of a pressure measurement cell 10 and an evaluation electronics 20. The evaluation electronics 20 comprises an analog evaluation circuit 30 and a microcontroller µC in which the analog output signal of the evaluation circuit 20 is digitized and further processed. The microcontroller µC provides the evaluation result as a digital or analog output signal e.g. to a PLC. For power supply, the pressure measurement device 1 is connected to a power supply line (12-36V).

Figure 2:
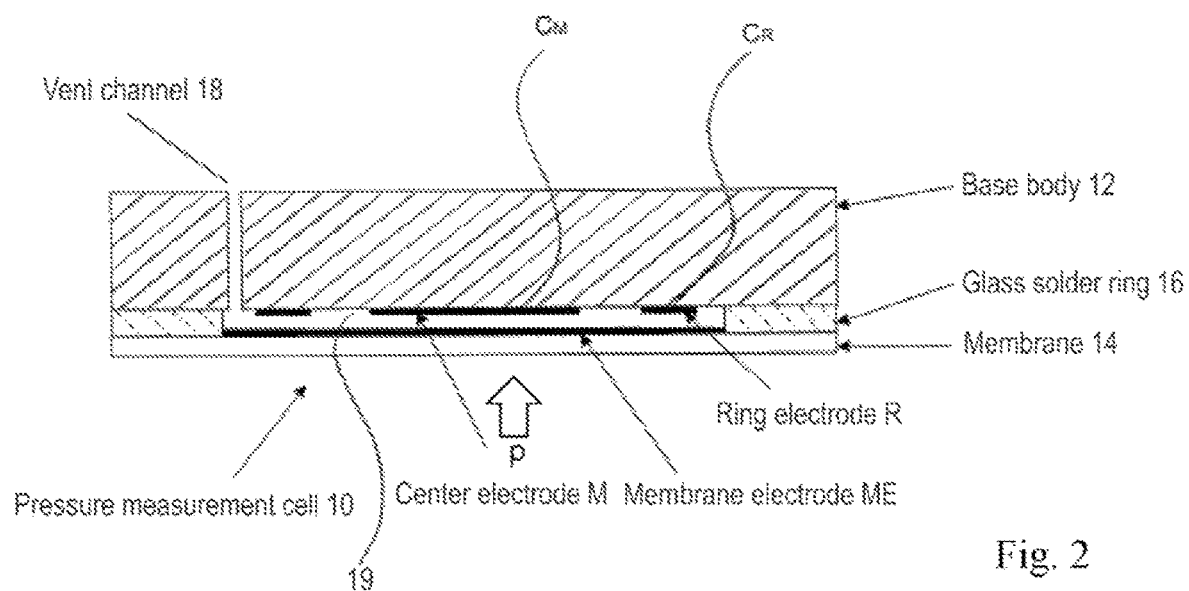
FIG. 2 a schematic cross-sectional view of a capacitive pressure measurement cell.

FIG. 2 shows a schematic representation of a typical capacitive pressure measurement cell 10, as used in a variety of capacitive pressure measurement devices. The pressure measurement cell 10 essentially consists of a base body 12 and a membrane 14, which are connected to each other via a glass solder ring 16. The base body 12 and the membrane 14 delimit a cavity 19, which—preferably only for low pressure ranges up to 50 bar—is connected via a vent channel 18 with the rear side of the pressure measurement cell 10.

Both on the base body 12 and on the membrane 14 a plurality of electrodes are provided, which form a reference capacitor $C_R$ and a measuring capacitor $C_M$. The measuring capacitor $C_M$ is formed by the membrane electrode ME and the center electrode M, the reference capacitor $C_R$ is formed by the ring electrode R and the membrane electrode ME.

The process pressure p acts on the membrane 14, which deflects to a greater or lesser extent in accordance with the pressurization, wherein the distance between the membrane electrode ME and the center electrode M essentially changes. This leads to a corresponding change in capacitance of the measuring capacitor $C_M$. The influence on the reference capacitor $C_R$ is smaller, since the distance between the ring electrode R and the membrane electrode ME changes less than the distance between the membrane electrode ME and the center electrode M.

In the following, no distinction is made between the designation of the capacitor and its capacitance value. $C_M$ and $C_R$ therefore denote both the measuring and the reference capacitor itself and their respective capacitance.

Figure 3:
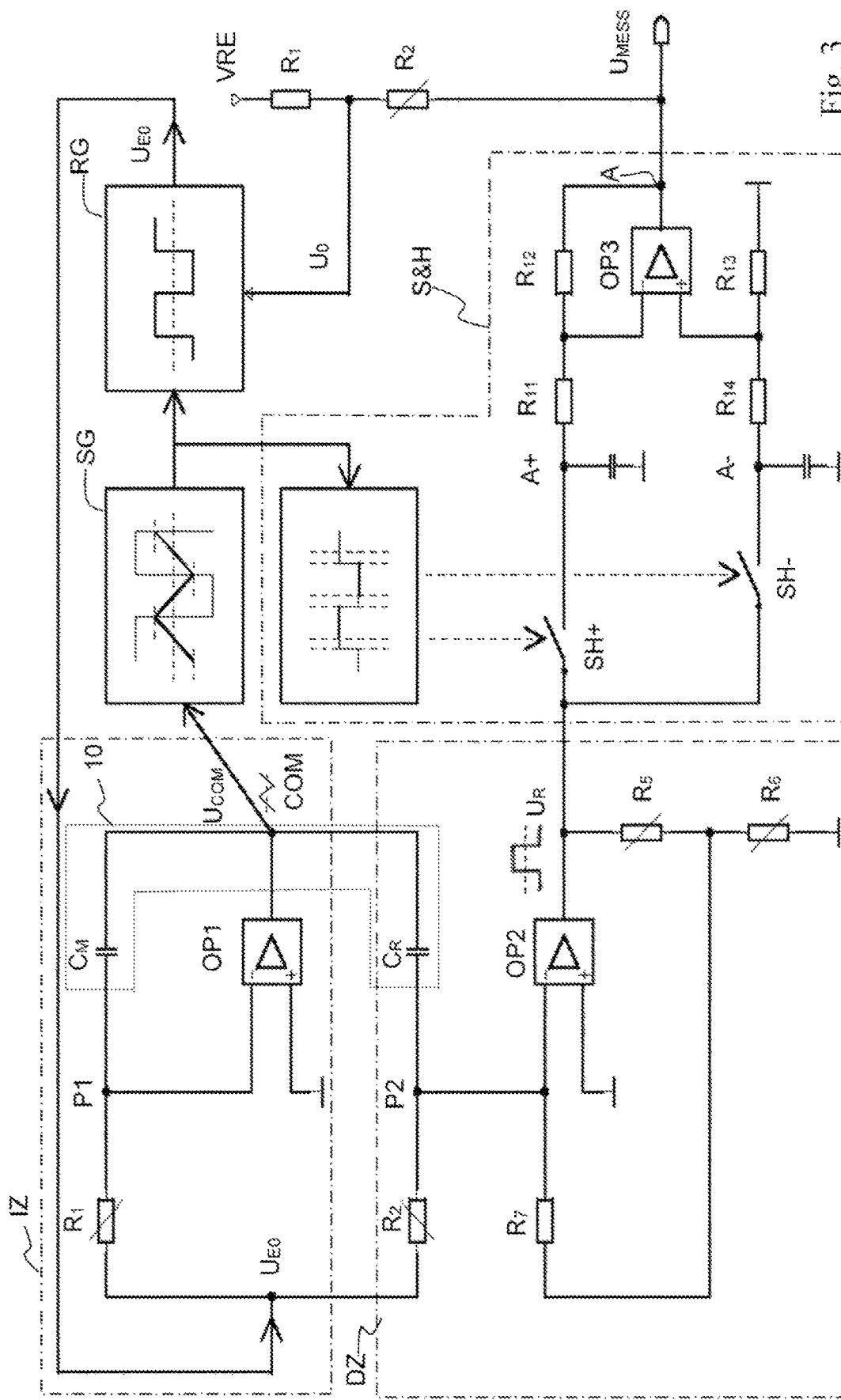
FIG. 3 a known evaluation circuit for a capacitive pressure measurement cell according to FIG. 2.

FIG. 3 shows a known evaluation circuit 30 for the pressure measurement cell 10 in more detail. The measuring capacitor $C_M$ is arranged together with a resistor $R_1$ in an integrating branch IZ and the reference capacitor $C_R$ is arranged together with a resistor $R_2$ in a differentiating branch DZ. A square-wave voltage $U_{E0}$, which preferably alternates symmetrically around 0 volts, is applied to the input of the integrating branch IZ. The input voltage $U_{E0}$ is converted via the resistor $R_1$ and the measuring capacitor $C_M$ with the use of an operational amplifier OP1, which acts as an integrator, into a linearly increasing or decreasing voltage signal (depending on the polarity of the input voltage), which is output at the output COM of the integrating branch IZ. The measuring point P1 is virtually grounded by the operational amplifier OP1.

The output COM is connected to a threshold comparator SG, which drives a square wave generator RG. As soon as the voltage signal $U_{COM}$ at the output COM exceeds or falls below a threshold value, the comparator SG changes its output signal, whereupon the square-wave generator RG respectively inverts its output voltage.

The differentiating branch DZ further consists of an operational amplifier OP2, a voltage divider with the two resistors $R_5$ and $R_6$ and a feedback resistor $R_7$. The output of the operational amplifier OP2 is connected to a sample-and-hold circuit S & H. At the output of the sample-and-hold circuit S & H, the measuring voltage $U_{Mess}$ is applied, from which the process pressure p acting on the pressure measurement cell 10 is obtained.

Hereinafter, the function of this measuring circuit is explained in more detail. The operational amplifier OP1 ensures that the connection point P1 between the resistor $R_1$ and the measuring capacitor $C_M$ is maintained virtually at ground. This causes a constant current $I_1$ to flow across the resistor $R_1$, which charges the capacitor $C_M$ until the square wave voltage $U_{E0}$ changes its sign.

FIG. 3 shows that for the case $R_1=R_2$ and $C_M=C_R$, the measuring point P2 in the differential branch DZ is at the same potential as the measuring point P1, i.e. at ground level, even if the connection between the measuring point P2 and the operational amplifier OP2 were not present. This is true not only in this special case but every time when the time constants $R_1*C_M$ and $R_2*C_R$ are equal to each other. During zero adjustment, this condition is set accordingly via the variable resistors $R_1$ and $R_2$, respectively. If the capacitance of the measuring capacitor $C_M$ changes due to the effect of pressure, the condition of equality of the time constants in the integrating branch IZ and in the differentiating branch DZ is no longer satisfied and the potential at the measuring point P2 would deviate from the value zero. However, this change is immediately counteracted by the operational amplifier OP2, since the operational amplifier OP2 continues to maintain the connection point P2 virtually at ground. Therefore, a square wave voltage $U_R$, the amplitude of which depends on the quotient of the two time constants, is present at the output of the operational amplifier OP2. It is easy to show that the amplitude is directly proportional to the process pressure $p \sim C_R/C_M - 1$, wherein the dependence is essentially linear. The amplitude can be adjusted via the voltage divider formed by the two resistors $R_5$ and $R_6$.

Via a sample-and-hold circuit S & H the positive and negative amplitude A+ and A− of the square-wave signal are added in terms of magnitude, and the magnitude A is output as a measurement voltage $U_{Mess}$ at the output of the operational amplifier OP3 and forwarded to the microcontroller μC (not shown). However, it could also be output directly as an analog value. The amplitude of the input voltage $U_{E0}$, which is applied to the output of the square wave generator RG, is adjusted in dependence of the measuring voltage $U_{Mess}$ in order to achieve a better linearity. To this end, a voltage divider consisting of resistors $R_{20}$ and $R_{10}$ is provided. This voltage divider is connected to a reference voltage VREF and can advantageously be adjusted.

The positive operating voltage V+ is typically at +2.5 V and the negative operating voltage V− is typically at −2.5 V.

Figure 4:
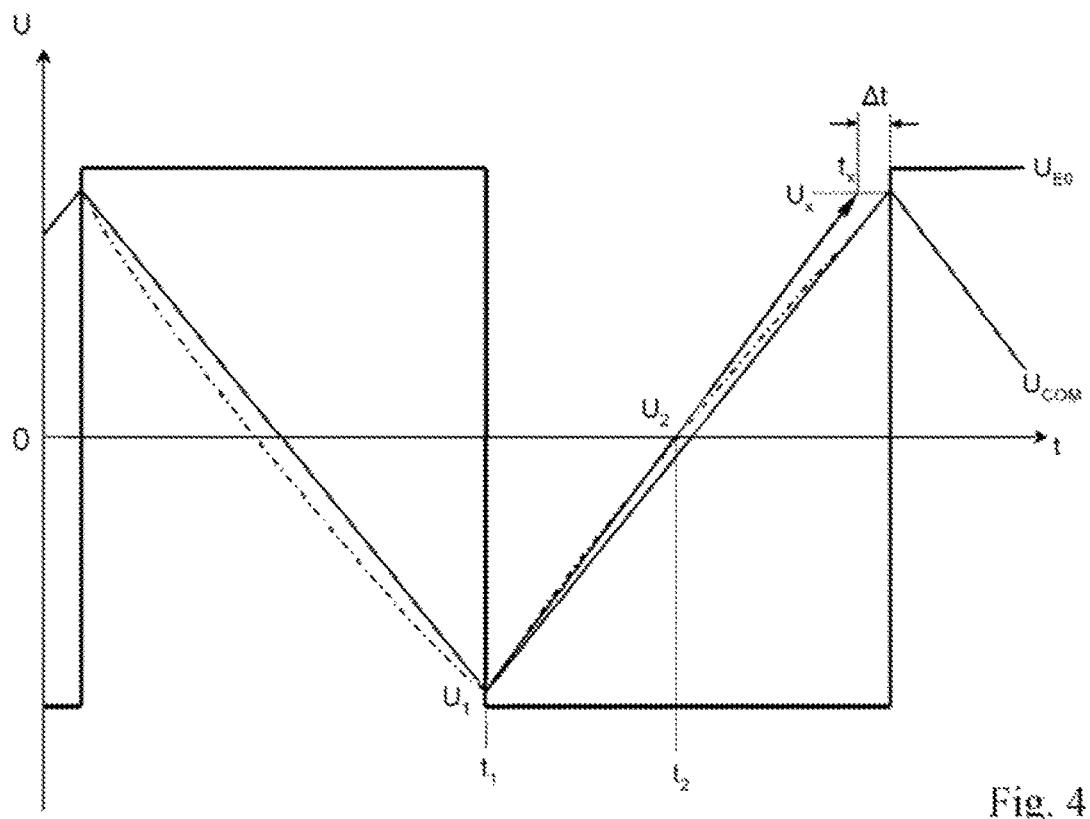
FIG. 4 a comparison of an error-free voltage signal and a voltage signal influenced by leakage currents according to a first embodiment of the method according to the invention.

FIG. 4 shows a first embodiment of the method according to the invention. On the one hand, the linearly rising or falling voltage signal $U_{COM}$ is shown, which is largely determined by the measuring capacitor $C_M$ and is output at the output COM of the integrating branch IZ. The solid line represents the ideal curve. Depending on the switching points set in the comparator oscillator SG, the square-wave voltage $U_{E0}$ is generated therefrom, which alternates symmetrically around 0 volts.

The dotted line shows the signal curve progression of the voltage signal $U_{COM}$ as it occurs, for example, when leakage currents occur due to moisture on the rear side of the pressure measurement cell 10 or in parts of the evaluation electronics. Instead of an evenly linear rising and falling curve progression, a belly-like curve progression occurs in this case. In concrete terms, the curve progression then appears such that both during the rising curve progression of the triangular signal and during the falling curve progression the slope first increases and then decreases. Depending on how large the resistive influence is, a more or less pronounced belly-like curve progression is obtained.

According to the invention, at at least two defined time points $t_1$, $t_2$ during the falling and/or rising signal curve progression the corresponding voltage values $U_1$, $U_2$ are detected from the voltage signal $U_{COM}$ and a linear equation $U=f(t)$ is determined based on the two pairs of values $t_1; U_1$ and $t_2; U_2$. FIG. 4 shows exemplarily the case where a straight line is placed in the rising signal curve progression. The time point $t_1$ corresponds here to the switchover point from the falling to the rising signal progression, while the time point $t_2$ is in the middle of the rising signal progression, so to speak at a quarter or three quarters of a period.

It can be clearly seen that in the case of a belly-like progression of the voltage signal $U_{COM}$, the straight line at the opposite switchover point reaches the threshold value defined in the comparator SG at the time point $t_x$ significantly earlier than the actual switchover time point. This time point $t_x$ can be easily calculated by use of the linear equation. By comparing $t_x$ with the actual switchover time point a time difference Δt is obtained. If now the time point $t_x$ significantly deviates from the actual switchover time point, i.e. the time difference Δt significantly exceeds the value zero, this indicates leakage currents and thus resistive influences on the measurement accuracy. As a result, this situation is indicated to the user in the form of an error signal.

Figure 5:
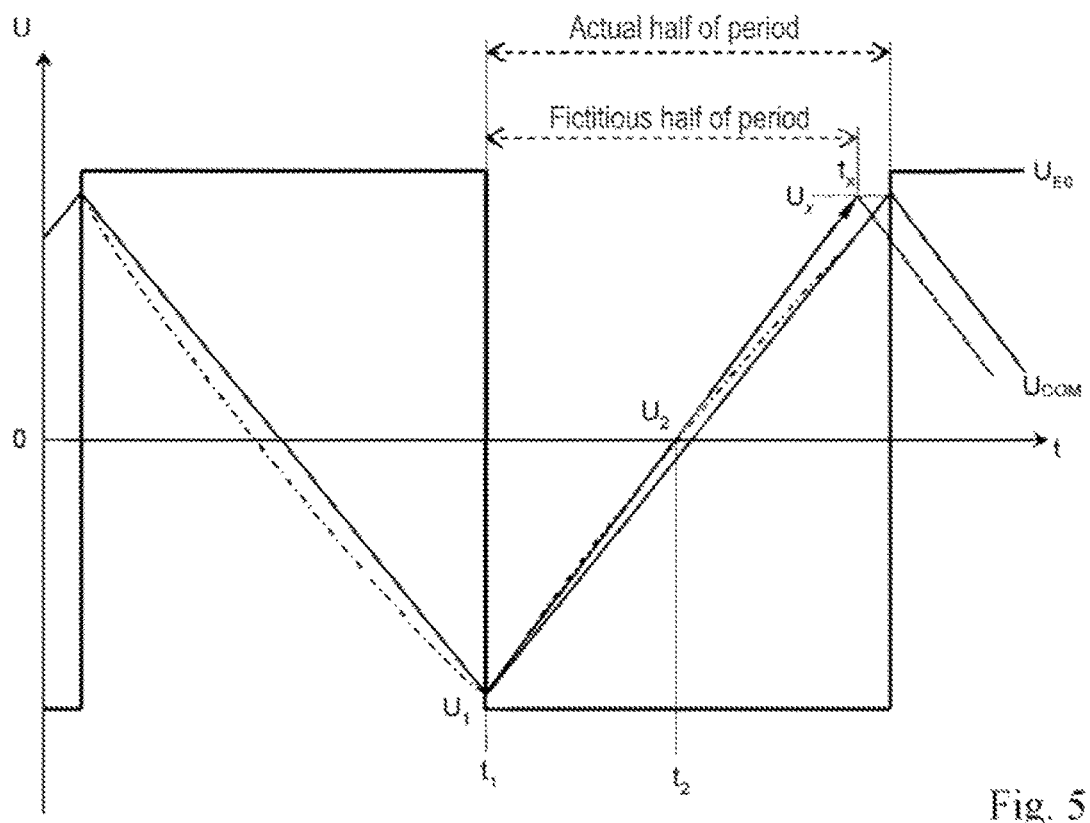
FIG. 5 a comparison of an error-free voltage signal and a voltage signal influenced by leakage currents according to a second embodiment of the method according to the invention.

FIG. 5 shows a second embodiment of the method according to the invention. The initial situation as well as the basic idea of the invention in the form of the formation of a straight line is identical to FIG. 4. The difference is the error detection. Whereas in the first embodiment according to FIG. 4 the error detection is carried out by means of time evaluation, in the second embodiment according to FIG. 5, the focus is on the evaluation of the working frequency.

The time point $t_x$ calculated when the threshold voltage is reached is defined as the fictitious switchover point of the comparator oscillator SG and a fictitious working frequency is calculated therefrom. This is illustrated by the dashed curve progression of the triangular signal after the switchover point. In the case of an error, a fictitious half of the period occurs which is shorter than the actual half of the period. Accordingly extrapolated, the fictitious period duration is shortened altogether compared to the actual period duration, so that a frequency difference occurs. When comparing the two working frequencies and detecting a significant deviation of this fictitious working frequency from the actual working frequency of the comparator oscillator SG, this in turn indicates leakage currents and thus resistive influences on the measurement accuracy, which is indicated to the user in the form of an error signal.

Figure 6:
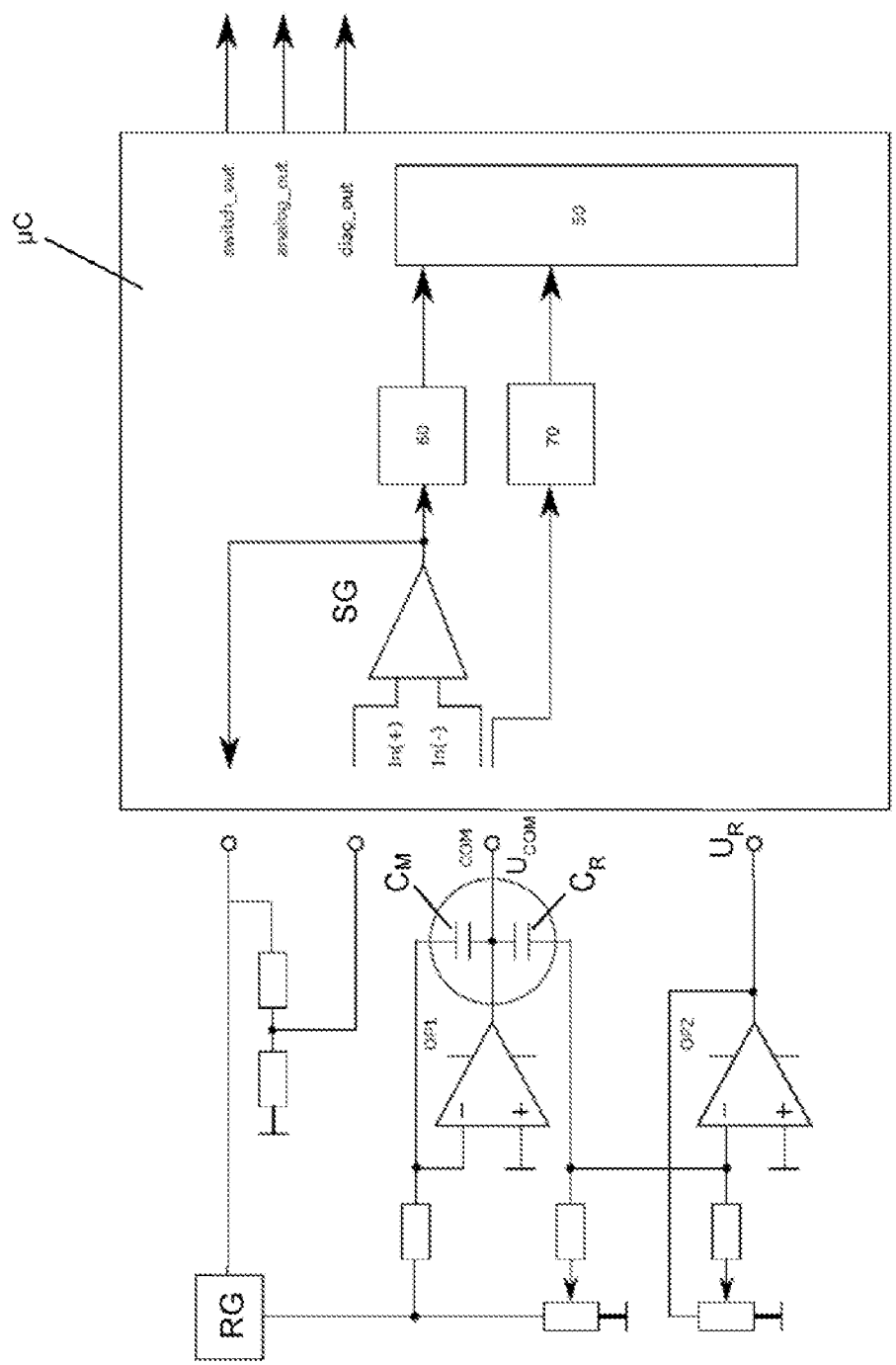
FIG. 6 the evaluation circuit from FIG. 3, supplemented by a microcontroller for carrying out the method according to the invention.

FIG. 6 shows in principle the evaluation circuit known from FIG. 3, which, however, is supplemented by a microcontroller μC. On the one hand, the comparator oscillator SG from FIG. 3 is integrated in this microcontroller μC and, on the other hand, the microcontroller includes the units necessary for carrying out the method according to the invention: a timer 60, a first processing unit 70 and a CPU 50 as the central processing unit. The elements located outside the microcontroller μC are substantially identical and are therefore designated identically. To avoid repetitions, only the elements essential to the invention will be discussed below.

On the one hand, the output signal of the threshold comparator SG is fed back to drive the square-wave generator RG, which is already known from FIG. 3. On the other hand, this signal is fed to the timer 60. In the timer 60, the periodic behavior of the triangular signal is logged, in particular with regard to the achievement of the set threshold values. From this, depending on whether the first or the second embodiment is applied, the actual switchover time point of the triangular signal $U_{COM}$ or its period duration is derived and fed respectively to the CPU 50.

The first processing unit 70 is a module comprising A/D converter and CPU resources, wherein of course the other inputs, too, comprise integrated A/D converters. This module 70 can of course also be integrated into the CPU unit 50. In this first processing unit 70, the determination of the linear equation $U=f(t)$ is carried out. In the CPU 50 itself then the calculation of the time point $t_x$ at which the set threshold value is fictitiously achieved by the straight line and then the comparison of the switchover time points or the period durations or working frequencies derived therefrom are carried out. If there is a significant deviation of the two switchover time points or the two period durations from a specified tolerance band, an error signal is generated which is output at the output diag_out output.

The currently measured pressure value in the form of the voltage signal $U_R$ known from FIG. 3 is output unchanged to the output switch_out or analog_out of the microcontroller μC in order to output the measured pressure values as a switch or analog signal. The sample-and-hold circuit S &

H known from FIG. 3 as a part of the evaluation circuit shown there is then also integrated in the microcontroller μC and is reproduced there in a functionally identical form.

LIST OF REFERENCE SYMBOLS 1 pressure measurement device
10 pressure measurement cell
12 base body
14 membrane
16 glass solder ring
18 vent channel
19 cavity
20 evaluation electronics
30 evaluation circuit
50 central processing unit, CPU
60 timer
70 first processing unit
$C_M$ measuring capacitor
$C_R$ reference capacitor
M center electrode
R ring electrode
ME membrane electrode
IZ integrating branch
DZ differentiating branch
SG threshold comparator
RG square-wave generator

The invention claimed is:

1. A method for monitoring unwanted leakage currents of a capacitive pressure measurement cell to detect resistive disturbing influences caused by leakage currents, wherein the pressure measurement cell comprises a measuring capacitor ($C_M$) and a reference capacitor ($C_R$) to which an internal excitation voltage ($U_{E0}$) is applied in the form of an alternating square-wave signal, and a pressure measuring value (p) is obtained from capacitance values of the measuring capacitor ($C_M$) and of the reference capacitor ($C_R$), wherein an excitation voltage ($U_{E0}$) is converted by means of the measuring capacitor ($C_M$) by integration into a rising or falling voltage signal ($U_{COM}$), and wherein the voltage signal ($U_{COM}$) is fed to a comparator oscillator (SG), as a result of which the excitation voltage ($U_{E0}$) is generated, wherein using an evaluation circuit comprising a microcontroller configured to determine a belly-like progression of voltage values ($U_1$, $U_2$) indicative of an error state, corresponding voltage values ($U_1$, $U_2$) are detected from the voltage signal ($U_{COM}$) during falling and/or rising signal progression at at least two defined time ($t_1$, $t_2$), and a linear equation U=f(t) is determined based on two pairs of values ($t_1$, $U_1$) and ($t_2$, $U_2$), wherein using the evaluation circuit, within a falling or rising signal progression with aid of the linear equation U=f(t) a time point ($t_x$) is calculated, at which a voltage value ($U_x$) set in the comparator oscillator (SG) as the threshold value or switchover point is achieved, wherein using the evaluation circuit either the time point ($t_x$) is compared with an actual switchover time point of the comparator oscillator (SG) and wherein the evaluation circuit is further configured to generate an error signal when in an event of a significant deviation, or a fictitious switchover point of the comparator oscillator (SG) is defined by the time point ($t_x$) and a fictitious working frequency is calculated therefrom and wherein the evaluation circuit is further configured to generate an error signal when in an event of a significant deviation of this fictitious working frequency from the actual working frequency of the comparator oscillator (SG).

2. The method according to claim 1, wherein the time point ($t_1$) corresponds to the switchover time point of the voltage signal ($U_{COM}$).

3. The method according to claim 1, wherein the time point ($t_2$) lies in the first half of the falling or rising signal curve progression.

4. The method according to claim 1, wherein the time point ($t_2$) lies in the middle of the falling or rising signal curve progression.

* * * * *